United States Patent [19]

Rasmussen

[11] Patent Number: 5,995,146
[45] Date of Patent: *Nov. 30, 1999

[54] MULTIPLE VIDEO SCREEN DISPLAY SYSTEM

[75] Inventor: Steffen Rasmussen, Novelty, Ohio

[73] Assignee: Pathway, Inc., Mayfield Village, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/788,016

[22] Filed: Jan. 24, 1997

[51] Int. Cl.$^6$ ........................................ H04N 7/18
[52] U.S. Cl. ........................... 348/385; 348/12; 348/387; 348/584; 348/588; 348/461
[58] Field of Search ..................... 348/384, 385, 348/405, 387, 423, 461, 462, 463, 464, 465, 720, 721, 845, 845.1, 845.2, 845.3, 12, 13, 398, 394, 588, 584, 589, 15

[56] References Cited

U.S. PATENT DOCUMENTS

| | | | |
|---|---|---|---|
| 5,623,308 | 4/1997 | Civanlar et al. | 348/423 |
| 5,652,749 | 7/1997 | Davenport et al. | 348/464 |
| 5,666,487 | 9/1997 | Goodman et al. | 348/384 |

*Primary Examiner*—Anand S. Rao
*Attorney, Agent, or Firm*—D. Peter Hochberg

[57] ABSTRACT

A video communications system for transmitting video data between a plurality of transmitting nodes and one or more receiving nodes. The video data at each transmitting nodes is scaled and assigned a display location at the receiving node(s) prior to transmission. The receiving node(s) simultaneously display video data received from each of the transmitting nodes. The video communications system minimizes the use of bandwidth, and uses a simple, inexpensive and efficient encoding and decoding system.

20 Claims, 5 Drawing Sheets ns to one or more receiving nodes. The transmitting nodes include scaling means for reducing a full size image to a scaled image, compression means for compressing the scaled image, and a display location means for providing a display location address for the scaled image. The system further includes a combiner means for combining scaled images from each of the transmitting nodes in accordance with the display location address, to form a combined image. The receiving nodes includes decompression means for decompressing the combined image generated by the combiner means, and display means for displaying the decompressed combined image comprised of the scaled images originating from the transmitting nodes.

MULTIPLE VIDEO SCREEN DISPLAY SYSTEM

FIELD OF THE INVENTION

The present invention relates generally to the field of video data communications, and more particularly to video data processing and transmission.

BACKGROUND OF THE INVENTION

With the present day advancement of high-bandwidth communication infrastructure and the widespread acceptance of digital video compression standards, there has been an increasing demand for video-based services. Among these new and expanding services are long distance education, surveillance systems, video-on-demand, interactive video games and video conferencing. Importantly, these and other future video-based services will need cost-effective and efficient video data processing and transmission systems and methods.

A typical multi-windows display system will display multiple video sequences to a video user. The windows environment allows the user to simultaneously view several video sequences or images originating from several different sources. However, prior art multiple window display systems have made inefficient use of bandwidth. Moreover, prior art multiple window display systems have needed complex encoding and decoding systems and methods, which are both costly and have significant processing delays.

In the case of digital image transmission applications, such as digital television, it has often been necessary to compress the image data in order to conserve bandwidth. In this regard, a frame of video (i.e., one full screen) may be composed of an array of at least 640×480 pixels. A video sequence is composed of a series of frames. In order to obtain a standard quality video sequence, a frame rate of at least 24 frames per second is necessary. To transmit this quantity of image data using the available bandwidth, various well known compression techniques have been employed. These compression techniques typically take advantage of pixel image data repetition, known as spacial correlation. Spacial correlation occurs when several adjacent pixels have the same or similar brightness and color values. Data compression techniques take advantage of this repetition by transmitting the brightness and color data from one pixel and transmitting information on the number of following pixels for which the data is identical, or by transmitting only the brightness and color data "difference" between adjacent pixels. Several video compression standards have become widely adopted, including MPEG1, MPEG2, JPEG and px64. However, it should be appreciated that in some situations compression alone does not reduce bandwidth consumption as much as desirable. Therefore, there is a need to further reduce bandwidth consumption.

Prior art multiple window display systems have also failed to address the problem of complex and costly encoding, decoding and other needed video process systems. In this regard, prior art systems do not encode the final display location of the video data at the receiving location. As a result, the decoding is made more complex, since the display information must be re-coded with the proper display location.

The present invention overcomes these and other drawbacks of prior art systems.

SUMMARY OF THE INVENTION

The present invention is directed to a video communications system for transmitting video data from a plurality of transmitting nodes to one or more receiving nodes. The transmitting nodes include scaling means for reducing a full size image to a scaled image, compression means for compressing the scaled image, and a display location means for providing a display location address for the scaled image. The system further includes a combiner means for combining scaled images from each of the transmitting nodes in accordance with the display location address, to form a combined image. The receiving nodes includes decompression means for decompressing the combined image generated by the combiner means, and display means for displaying the decompressed combined image comprised of the scaled images originating from the transmitting nodes.

It is an object of the present invention to provide a video communications system which prescales a video image prior to transmission.

It is another object of the present invention to provide a video communications system which conserves transmission bandwidth.

It is another object of the present invention to provide a video communications system which determines and assigns a final display location of the video image prior to encoding and transmission to a receiving location.

It is still another object of the present invention to provide a video communications system which minimizes the complexity of the encoding and decoding circuitry.

It is still another object of the present invention to provide a video communications system which is fast, efficient and minimizes processing delays.

The above discussed objects, as well as additional objects and advantages of the present invention will become more readily apparent by reference to the following detailed description and the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE PREFERRED EMBODIMENT

Figure 1:
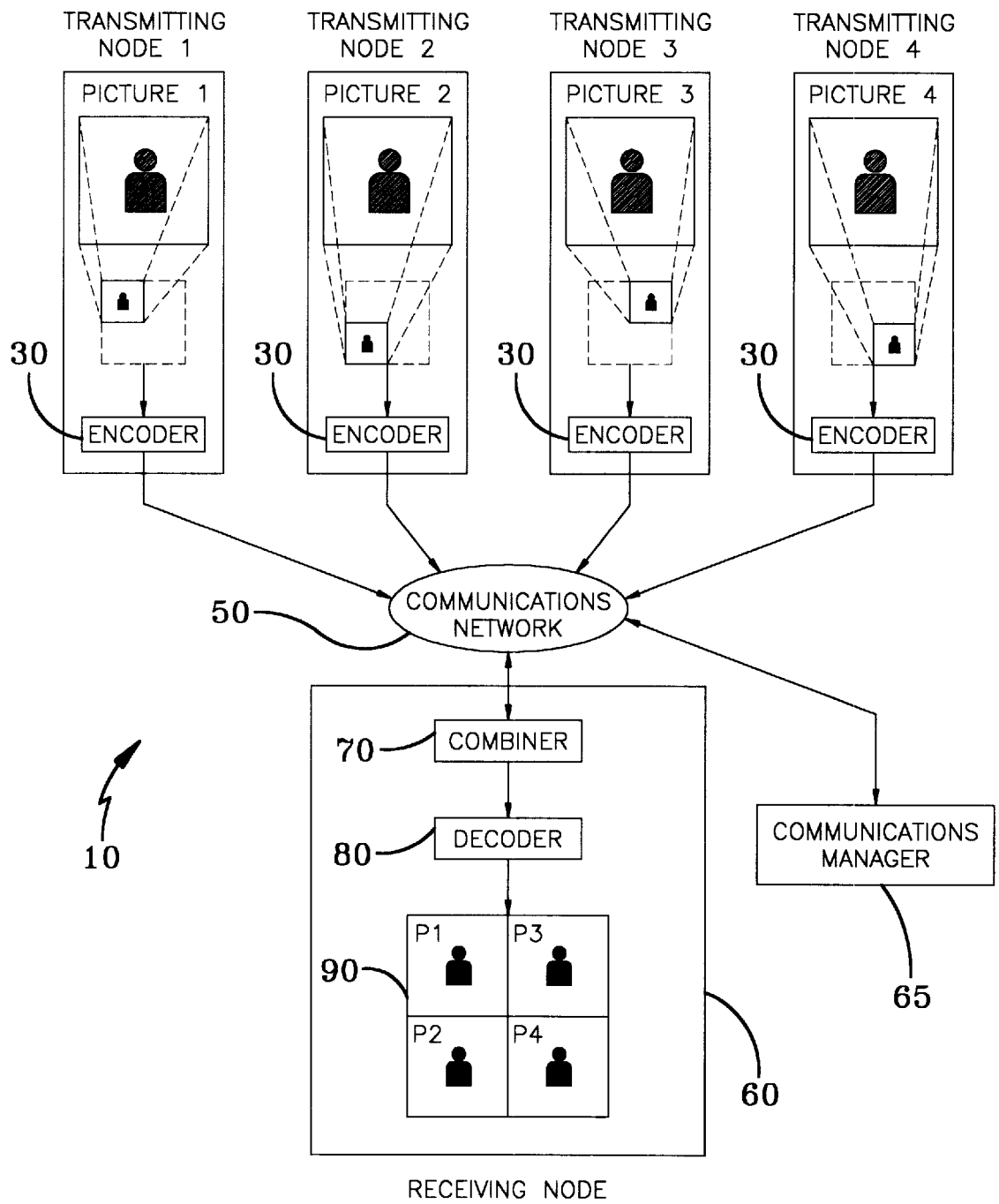
FIG. 1 illustrates an example of a video communications system according to a preferred embodiment of the present invention.

Referring now to the drawings wherein the showings are for the purpose of illustrating a preferred embodiment of the invention only, and not for the purpose of limiting same, FIG. 1 illustrates an example of a video communications system 10 in accordance with a preferred embodiment of the present invention. While the exemplary system in FIG. 1 shows a five node video communications system, any number of nodes are possible using the present invention. Moreover, it should be appreciated that there may be more than one receiving node, and that each receiving node may also be a transmitting node, and vice versa. In this respect, each node may both transmit and receive picture data, or only perform one of the foregoing functions.

It should be understood that while a preferred embodiment of the present invention will now be described with reference to a video communications system using the MPEG2 video compression method, it is contemplated that the present invention may be used in conjunction with other video compression methods, including MPEG1, JPEG and px64. Moreover, the present invention may also be used with infraframe, interframe and motion compensated video compression methods.

Video communications system 10 is generally comprised of transmitting nodes 1 through 4, a communications network 50, a receiving node 60 and a communications manager 65. Transmitting nodes 1–4 and receiving node 60 may take the form of a workstation or a video conferencing system. The source of the picture data may be a video camera, a video cassette recorder (VCR), or other suitable video sources. Transmitting nodes 1 through 4 respectively include encoders 30 which encode pictures 1 through 4. Encoders 30 transmit picture data to receiving node 60 through communications network 50. Encoders 30 will be described in detail below.

Communications network 50 is a communications link for transferring data between transmitting nodes 1–4 and receiving node 60. Communications network 50 may take the form of any suitable communications link. Preferably, communications network 50 is an Asynchronous Transfer Mode (ATM) network, in order to obtain the highest data transfer rate. In an ATM network, the nodes coordinate with each other to send fixed-size data chunks (i.e., "cells") to fully utilize the potential bandwidth of the network. ATM interface rates generally range from 1.5 megabits per second (mbps) to 620 mbps, which is suitable for carrying voice, data, and compressed video. It should be understood that when an ATM network is used, each node will have an ATM transport for communicating with the ATM network.

Receiving node 60 is generally comprised of a combiner 70, a decoder 80 and a video display 90. Combiner 70 receives encoded picture data originating from each of the transmitting nodes 1–4 and combines them into one combined picture, as will be described in detail below. Decoder 80 decodes the encoded combined picture data and displays the combined pictures on display 90. Combiner 70 and decoder 80 are described in detail below.

Communications manager 65 is a system for establishing how many pictures will be simultaneously displayed at receiving node 60. In addition, communications manager 65 establishes the size and display location of the pictures simultaneously displayed at receiving node 60. Communications manager 65 may receive information relating to a communications session (including a specified picture size and picture display location) from either a user or from a scheduler. It should be appreciated that communications manager 65 may be located at the receiving node or may be a shared resource on the network, as shown in FIG. 1.

Figure 3:
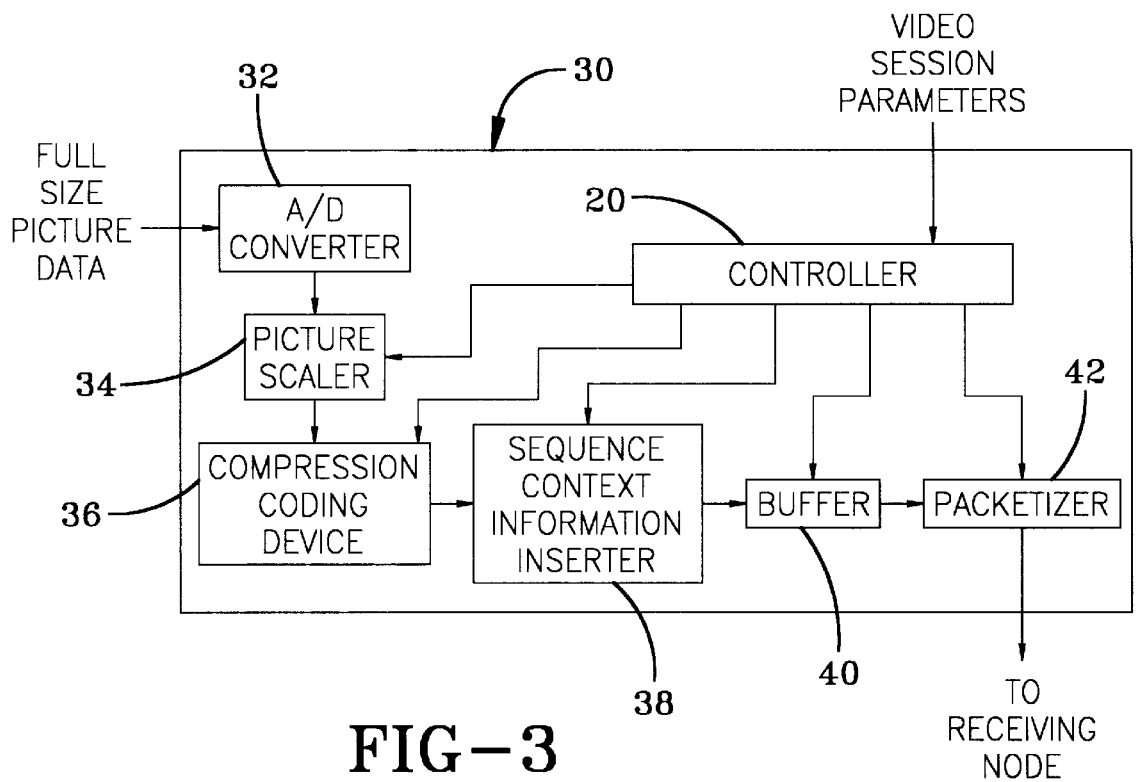
FIG. 3 provides a functional block diagram of the encoding system according to a preferred embodiment of the present invention.

A detailed description of encoder 30 will now be provided with reference to FIG. 3. Encoder 30 is generally comprised of a controller 20, an analog-to-digital (A/D) converter 32, a picture scaler 34, a compression coding device 36, a sequence context information inserter 38, a buffer 40, and a packetizer 42.

Controller 20 provides overall control of encoder 30, and receives the picture size and location information from communications manager 65. A/D converter 32 converts analog "full size" picture data into digital picture data. It should be understood that the term "full size" as used herein refers to unscaled picture data which may fill a full screen or fill less than a full screen.

Figure 2A:
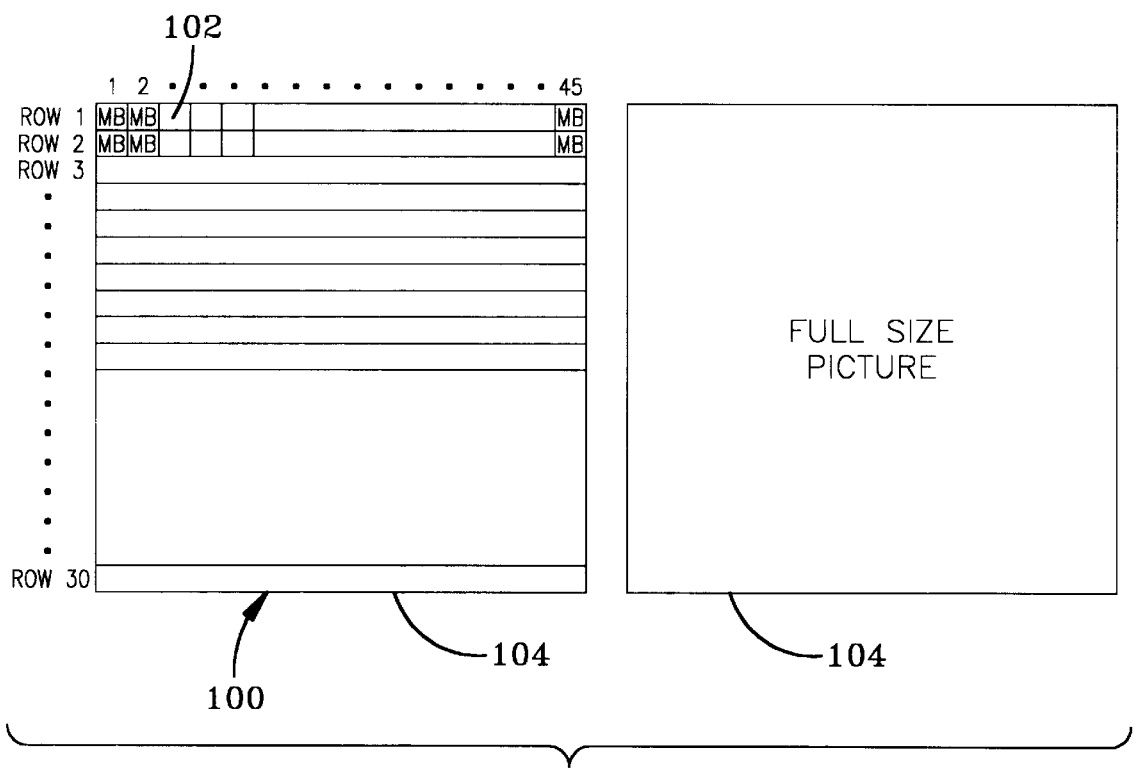
FIG. 2A illustrates a full size picture prior to scaling.
Figure 2B:
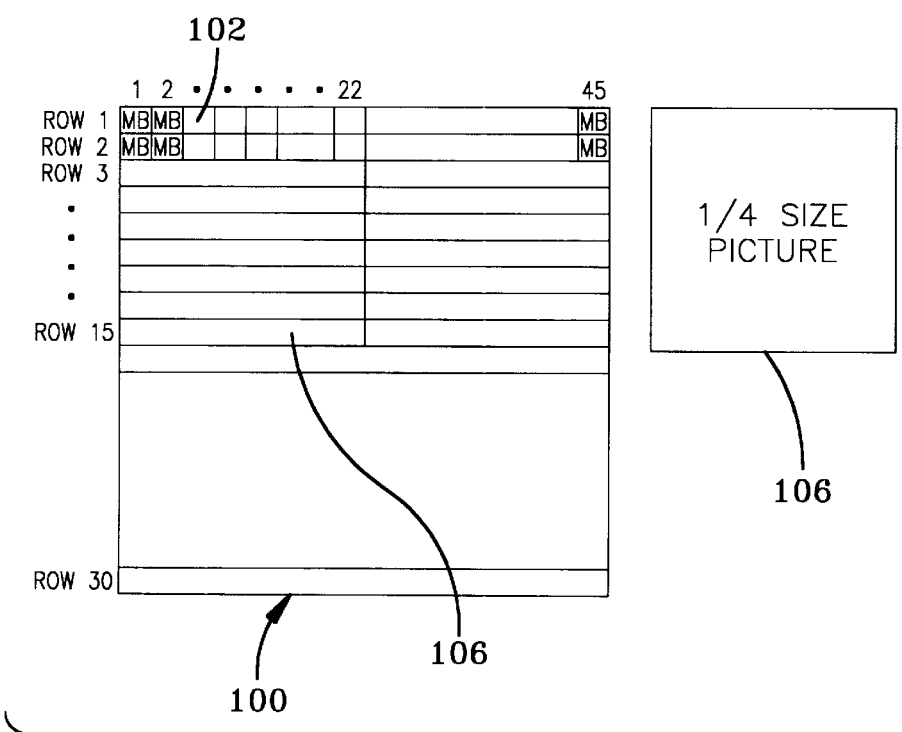
FIG. 2B illustrates the picture in FIG. 2A as scaled to quarter size.

Picture scaler 34 reduces the full size picture to the "scaled" picture size specified by controller 20. The operation of picture scaler 34 will now be described with reference to FIGS. 2A and 2B. Pictures 104 and 106 are composed of macroblocks (MB) 102, which in turn are composed of one or more 8×8 pixel blocks. A set of consecutive macroblocks 102 are known as a "slice." The shortest slice is one macroblock, while the longest slice is the maximum number of macroblocks in a row of a frame. The number of 8×8 pixel blocks and the structure of the 8×8 pixel blocks in a macroblock will vary depending upon the chosen video compression standard (e.g., MPEG formats 4:2:0, 4:2:2 and 4:4:4). FIG. 2A shows "full size" (i.e., full resolution) picture 104 as it fills a frame 100, which is one full screen. FIG. 2B shows quarter-size picture 106 as it fills only a quarter of frame 100. It can be seen that the scaled picture 106 consists of fewer macroblocks and slices than full size picture 104. Only the shaded macroblocks in FIG. 213 require encoding. As noted above, a "full size" picture need not fill one full screen, but instead may fill only a portion of a screen.

Scaling the pictures reduces the total number of macroblocks that are required to be compressed. When the pictures are scaled, a lower output data rate of the encoder will be achieved, which will ultimately save transmission bandwidth in the system proportionate to the size of the reduction. In the example shown in FIG. 2A, full size picture 104 requires 30 rows with 45 macroblocks per row. Accordingly, the total macroblock requirement to send "full size" picture 104 is 1,350 macroblocks. When the picture is reduced to one-fourth size (FIG. 2B), the number of macroblocks is reduced to 15 rows with 22 macroblocks per row, for a total of 330 macroblocks.

Compression coding device 36 codes the "scaled" picture data using a video compression method, such as MPEG2. Compression coding device 36 is preferably a chip or chip set operable to compress macroblocks according to the MPEG2 standard.

Sequence context information inserter 38 inserts sequence context information into the MPEG2 encoded picture data. The sequence context information includes picture size information, picture location information, as well as other coding parameters used in the chosen video compression method. The sequence context information will be used by combiner 70 to generate a "combined" picture, as will be explained below.

It should be understood that in accordance with the MPEG2 video compression standard, data streams are transmitted over an ATM network using layered data structures. In this regard, MPEG2 coded video data is formatted in encoded macroblocks which are transmitted with a macroblock marker containing the other information needed for an MPEG2 compatible decoder. Macroblocks are packed into slices which are formatted into an elementary stream (ES). An ES may hold partial pictures, complete pictures (i.e., a frame) or a group of pictures. Compression coding device 36, together with sequence context information inserter 38, will generate elementary streams (ES) comprising picture data and sequence context information.

Buffer 40 stores the encoded picture data while it awaits transmission to the receiving node. Buffering may be necessary for proper data transmission. Packetizer 42 packetizes the encoded picture data prior to transmission. In this regard, packetizer 42 formats the elementary streams (ES) into packetized elementary streams (PES), and formats the packetized elementary streams (PES) into transport streams (TS). The transport streams (TS) include program information data (PID) which identifies the source of the picture data (i.e., the transmitting node sending the elementary streams). Accordingly, the PID allows combiner 70 to identify the source of the different pictures it receives for combination. In addition, packetizer 42 formats the TS into service data units (SDU), which are arranged as the payload of ATM cells. In this respect, the SDU will fit into the payload of exactly eight ATM cells. Each ATM cell has a payload of 48 bytes and a header of five bytes for a total of 53 bytes per cell. The ATM cells identify the destination address of the elementary streams, which will be the location of combiner 70. In the present example, this location will be receiving node 60. If there are several receiving nodes (each having a combiner 70), the ATM cells will identify several addresses.

Combiner 70 will receive ATM cells from several locations. As noted above, each TS cell has different PIDs, which allow combiner 70 to determine the source of the picture data, and thus separate the different MPEG video channels. Combiner 70 sorts incoming TS cells into appropriate memory locations and extracts the ES payloads and necessary header information, as will be described in detail below.

Operation of encoder 30 will now be described in detail. Communications manager 65 receives communication session information from a user or a scheduler. From this information, communications manager 65 sets up a communications session by determining how many nodes are connected to the communications session. In addition, communications manager 65 establishes the video session parameters, which include picture size and the display location for each picture to be displayed at the receiving node(s). Communications manager 65 provides video session parameters to controller 20 of each transmitting node involved in the communications session. In the example shown in FIG. 1, there are four transmitting nodes, therefore video display 90 at receiving node 60 may be divided into quarters to simultaneously display pictures from four different transmitting nodes.

Each transmitting node generates full size (i.e., full resolution) picture data (e.g., 720×480, 720×575, 640×480 or other typical picture size). This full size picture data is applied to A/D converter 32 which converts the picture data to digital data. Picture scaler 34 then reduces the full size picture data in accordance with the picture size specified by controller 20. In the example shown in FIG. 1, the full size picture data is reduced to one-quarter size. As noted above, reducing the picture size reduces the transmission bandwidth required to transmit the picture data. The reduction in bandwidth requirements is accomplished because the reduced size picture data requires fewer macroblocks, as explained above in connection with FIGS. 2A and 2B.

After picture scaler 34 has generated scaled picture data, compression coding device 36 compresses the scaled picture data in accordance with a video compression method. Compression coding device 36, along with sequence context information inserter 38, will generate elementary streams (ES). In the example shown in FIG. 1, an elementary stream based on I-frame coded picture (4:2:2) with a slice length of 22 macroblocks is generated. Compression coding device 36 may also add picture data to define a border around the coded picture, which will serve as a background for the combined picture.

The elementary streams (ES) are comprised of an ES header and an ES payload. The ES header includes a reference display location. The ES payload contains macroblock headers, and macroblocks which form slices. The macroblock headers include display location information for the respective macroblocks, as well as other macroblock attribute information. The display location information in the macroblock header defines a relative display location. In this regard, the macroblock header for the first slice will specify a display address relative to the reference display location specified in the ES header. Subsequent macroblock headers will specify a display address relative to the display location of the previous slice.

After the elementary streams have been generated, the compressed picture data is stored in buffer 40. Packetizer 42 will format the macroblocks into packets appropriate for transmission over communications network 50. It should be appreciated that where communications network 50 takes the form of an ATM network, each packet will be assigned a destination address identifying the destination of the elementary streams.

Figure 4:
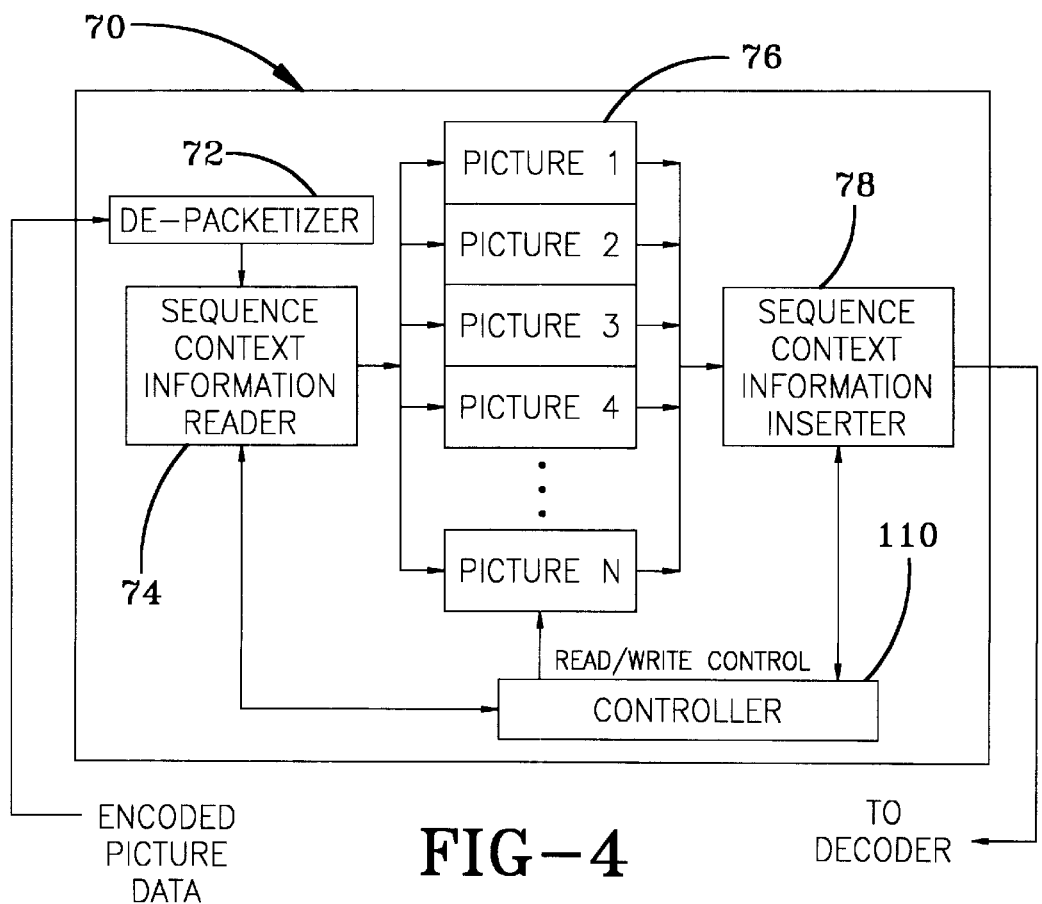
FIG. 4 shows a functional block diagram of a combiner according to a preferred embodiment of the present invention.

Combiner 70 will now be described in detail with reference to FIG. 4. Combiner 70 is generally comprised of a de-packetizer 72, a sequence context information reader 74, a memory 76, a sequence context information inserter 78 and a controller 110. Controller 110 provides overall control of combiner 70. De-packetizer 72 de-packetizes the encoded picture data received from the transmitting nodes. Sequence context information reader 74 reads the sequence context information inserted into the encoded picture data. As indicated above, the sequence context information includes picture size information, picture location information, and other coding parameters. Memory 76 stores the encoded picture data from each of the transmitting nodes. Sequence context information inserter 78 inserts the appropriate sequence context information into the ordered encoded picture data. This sequence context information is inserted into an ES header 220 for the combined pictures, and specifies decoding information such as frame rate, aspect ratio, size, and display location for the combined picture.

It should be appreciated that while combiner 70 has been shown as a part of receiving node 60, combiner 70 may be arranged separate from the receiving node and provided as a shared network resource. Where combiner 70 is arranged as a shared resource, it will also generate a new TS and ATM cell specifying the address(es) of the receiving node(s).

Figure 5A:
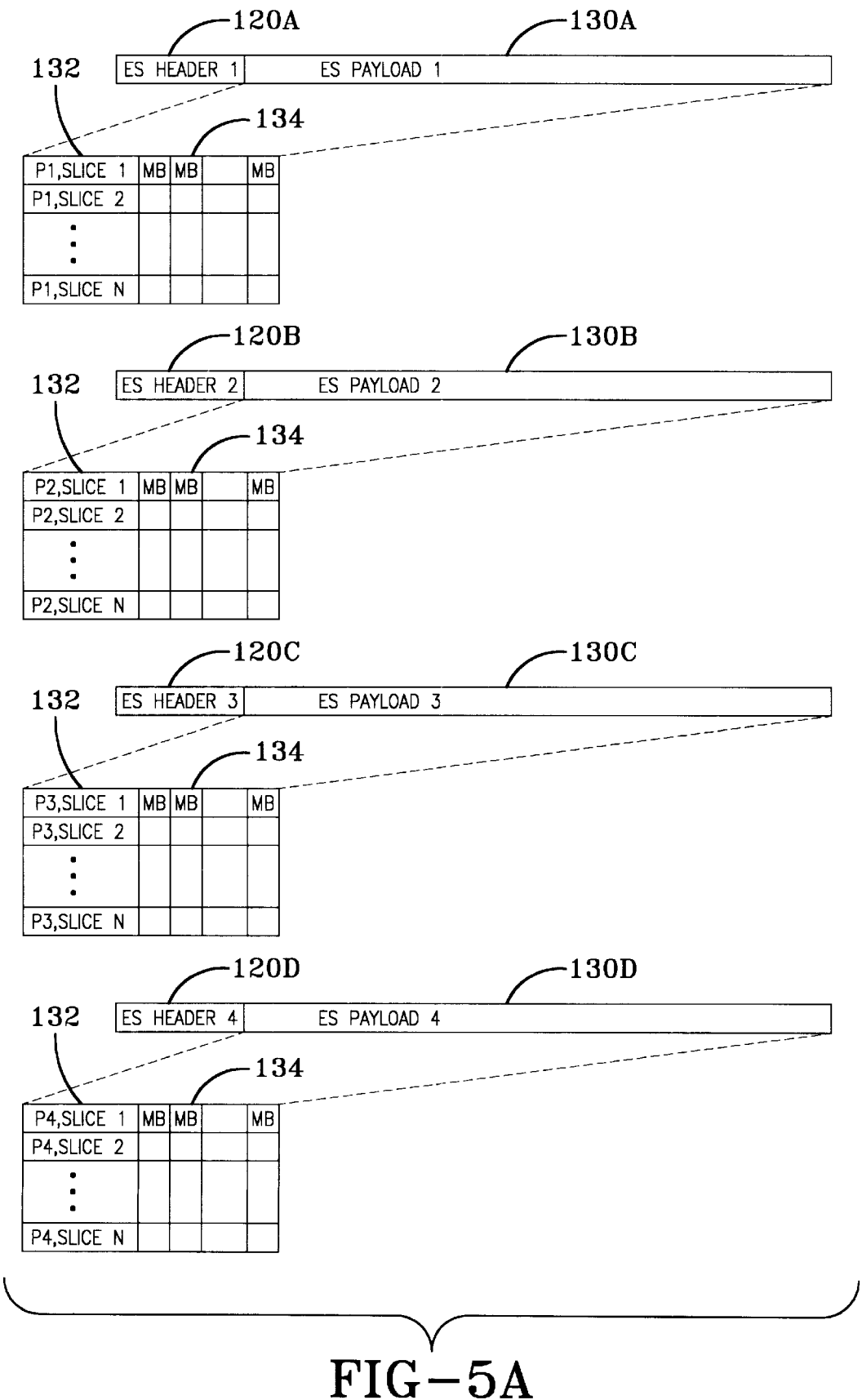
FIG. 5A illustrates MPEG standard Elementary Stream (ES) headers and payloads originating from a plurality of transmitting nodes.

Operation of combiner 70 will now be described in detail with reference to FIG. 4 and FIGS. 5A and 5B. Encoded picture data is received by de-packetizer 72. The depacketized data is then read by sequence context information reader 74. This allows controller 110 to analyze the sequence context information associated with the picture data. It should be appreciated that controller 110 may receive picture size and display location information from communications manager 65. Communications manager 65 provides controller 110 with the number of transmitting nodes involved in the video communications session, the picture sizes and display locations. This information is used by controller 110 to store picture data in the appropriate memory location in memory 76.

As discussed above, MPEG coded picture data is formatted in slices composed of macroblocks. The slices are formatted into elementary streams (ES). Each elementary stream is comprised of an ES header and an ES payload. FIG. 5A illustrates the respective ES headers 120A–120D and the respective ES payloads 130A–130D for transmitting nodes 1–4. As can be seen each ES payload consists of slices 134 for the respective scaled picture and macroblock headers 132.

Controller 110 writes into memory 76 the ES payloads 130A–130D for each incoming picture. Memory locations labelled "picture 1" store N slices corresponding to picture 1 from transmitting node 1. Likewise, memory locations labelled "picture 2," "picture 3" and "picture 4" respectively, store N slices corresponding to pictures 2, 3 and 4 from transmitting nodes 2, 3 and 4. Next, controller 110 reads the slices out of memory 76 to form a "combined" picture consisting of a plurality of scaled pictures from different transmitting nodes. The slices are read out of memory 76 in a specified order.

Figure 5B:
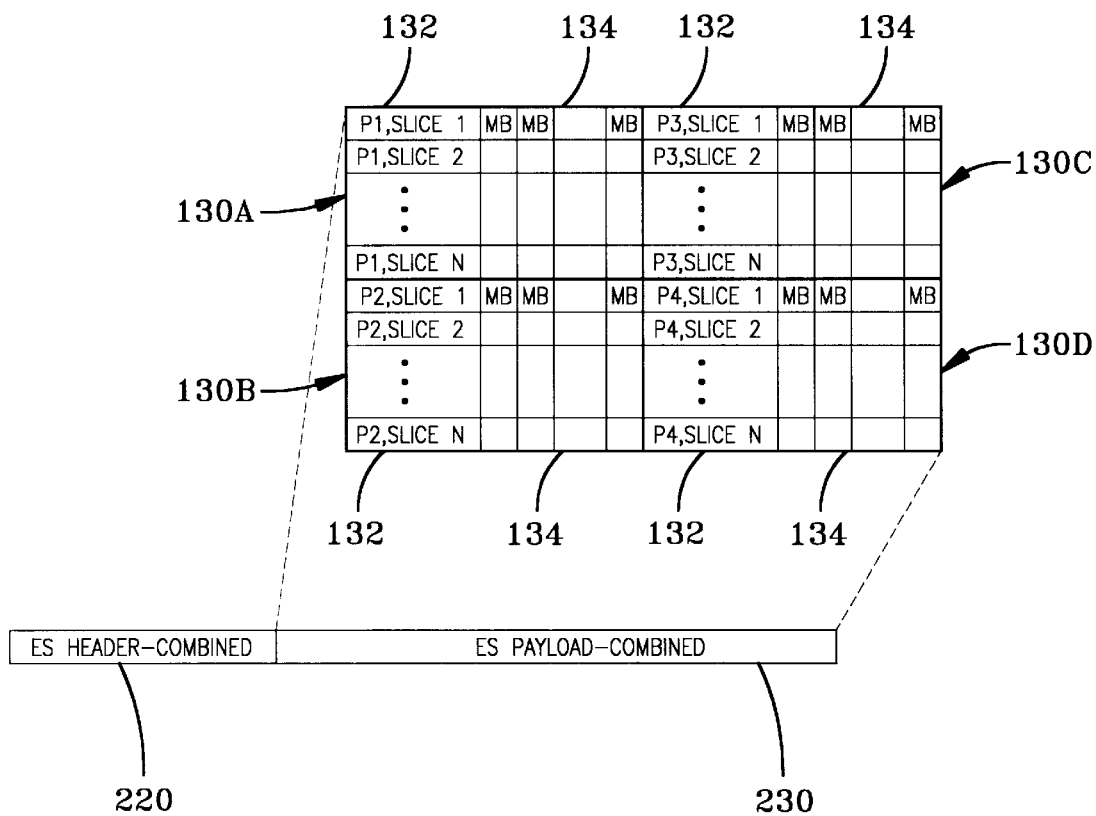
FIG. 5B illustrates MPEG standard Elementary Stream (ES) headers and payloads for a combined picture to be displayed at a receiving node.

FIG. 5B shows ES header 220 and ES payload 230 for the combined picture. In the present example, ES payload 230 is generated by controller 110 reading from memory 76 slice 1 of picture 1, then reading slice 1 of picture 3. Next, slice 2 of picture 1 and slice 2 of picture 3 are read out of memory 76. This process continues until no more slices are available from this frame of picture 1 and 3. Next, controller 110 reads out of memory 76 slice 1 of picture 2, and then slice 1 of picture 4. Next, slice 2 of picture 2 and slice 2 of picture 4 are read out of memory 76. This process continues until all the slices from pictures 2 and 4 have been read. In the present example, two slices are provided per row of macroblocks.

It should be appreciated that combiner 70 in no way alters the macroblock display location addresses in macroblock headers 132, but rather merely reorders the slices as per the display location address assigned by encoders 30.

It should be noted that in the foregoing process of generating ES header 220 the contents of macroblock headers 132 are not changed. However, if desired, the contents of macroblock headers 132 could be modified prior to generation of ES payload 230. It should also be appreciated that if simultaneous display of the combined scaled pictures does not fill a full screen frame, and it is desired to fill a full screen frame, a border or the like may be inserted to fill the empty space.

Once ES payload 230 for the combined picture has been constructed, ES header 220 is attached, and the combined picture is ready for decoding by decoder 80. In this regard, sequence context information inserter 78 provides sequence context information in ES header 220 which relates to the "combined" picture stored in ES payload 230. For instance, the sequence context information may specify the display location of the combined picture. This is particularly important where the combined picture fills less than a full screen.

Decoder 80 decodes the macroblocks as if they form a single picture. Decoder 80 then provides video information to video display 90 for displaying the combined picture comprised of a plurality of reduced-size pictures. The combined picture may fill the full screen or it may fill less than a full screen. Decoder 80 is preferably a chip or chip set operable to decompress macroblocks according to the MPEG2 or MPEG1 standard. It should be appreciated that decoder 80 may be configured to decode a fixed size picture. Accordingly, decoder 80 is unaware that the combined picture actually consists of a plurality of scaled pictures from multiple sources. It should also be noted that decoder 80 does not require any context switchable features since all the context information (e.g., picture size and picture location) for each picture is transmitted as a part of the headers.

Additional post-processing may take place after decoding to further reduce or relocate each picture.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or equivalents thereof.

Having described the invention, the following is claimed:

1. A video communications system comprising:
   a plurality of video transmission nodes and one or more receiving nodes, said transmission nodes including:
      scaling means for generating scaled picture data from full size picture data, said scaled picture data defining a reduced size picture,
      compression means for compressing the scaled picture data, and
      display information insertion means for inserting final display location and size data in a header attached to the compressed scaled picture data, the display location and size data defining the display location for the scaled picture data and size of the scaled picture data to be displayed at the one or more receiving nodes; and
   said receiving nodes comprising:
      display information reader means for reading display location and size data from the header attached to said compressed scaled picture data from each of said plurality of video transmission nodes transmitting scaled picture data;
      combiner means for combining compressed scaled picture data from the plurality of video transmission nodes transmitting compressed scaled picture data into combined picture data defining a combined picture comprised of a plurality of reduced size pictures, said combiner means combining the compressed scaled picture data by writing the compressed scaled picture data into specified memory locations in accordance with the display location and size data read from the header attached to the compressed scaled picture data from each of said plurality of video transmission nodes transmitting scaled picture data, and reading the compressed picture data from the specified memory locations in a specific order to form a combined compressed picture, and
      decompression means for decompressing the combined compressed picture data;
      display means for displaying the decompressed combined picture data in accordance with the display location and size data; and
   a communications medium for connecting the plurality of video transmission nodes to the one or more video receiving nodes.

2. A system as defined in claim 1, wherein said compression means is an MPEG2 standard compatible device, and said decompression means is an MPEG2 standard compatible device.

3. A system as defined in claim 1, wherein said communications medium is an asynchronous transfer mode (ATM) network.

4. A system as defined in claim 1, wherein one or more of the video transmitting nodes is also a video receiving node.

5. A system as defined in claim 1, wherein said combined picture is a single full size picture.

6. A video communications system comprising:
   a plurality of video transmitting nodes, at least one of said transmitting nodes having scaling means for reducing a full size picture defined by full size picture data to a reduced size picture defined by scaled picture data;
   compression means for compressing the scaled picture data,
   display information insertion means for inserting final display location and size data in a header attached to the compressed scaled picture data;
   combiner means for combining the compressed scaled picture data from said plurality of video transmitting nodes into a compressed combined picture data, the combined picture data defining a combined picture comprised of a plurality of reduced size pictures, said combiner means combining the compressed scaled picture data by writing the compressed scaled picture data into specified memory locations in accordance with the display location and size data read from the header attached to the compressed scaled picture data from each of said plurality of video transmission nodes transmitting scaled picture data, and reading the compressed picture data from the specified memory locations in a specific order to form a combined compressed picture,
   one or more video receiving nodes for receiving the combined picture data, the receiving nodes including display means for displaying the combined picture data;
   communication means for communicating to said display information insertion means a desired final display location and size of said reduced size picture on said display means for displaying said reduced size picture for each of said plurality of reduced size pictures; and
   communications link means for connecting the plurality of video transmitting nodes to the one or more video receiving nodes.

7. A system as defined in claim 6, wherein said transmitting nodes further comprises compression means for compressing the scaled picture data, and said receiving nodes further comprise decompression means for decompressing the combined picture data.

8. A system as defined in claim 7, wherein said compression means is an MPEG2 standard compatible device, and said decompression means is an MPEG2 standard compatible device.

9. A system as defined in claim 6, wherein said transmitting nodes further comprises means for providing display location and size data to said scaled picture data, said combiner means combining the scaled picture data in accordance with the display location and size data.

10. A system as defined in claim 6, wherein one or more of the video transmitting nodes is also a video receiving node.

11. A system as defined in claim 6, wherein said communications link means is an asynchronous transfer mode (ATM) network.

12. A system as defined in claim 6, wherein said combined picture is a single full size picture.

13. A method for communicating pictures originating from a plurality of transmitting nodes to one or more receiving nodes, the method comprising:
   inputting full size picture data defining a full size picture;
   scaling the full size picture data at each transmitting node to generate scaled picture data defining a reduced size version of the full size picture;
   compressing the scaled picture data generated at each transmitting node;
   inserting final display location and size data in a header attached to the compressed scaled picture data, the display location and size data defining the display location for the scaled picture data and size of the scaled picture data to be displayed at the one or more receiving nodes;
   transmitting the compressed scaled picture data from each of the transmitting nodes to a combiner means, wherein said combiner means combines the compressed scaled picture data from each transmitting node into combined picture data, said combiner means combining the compressed scaled picture data by writing the compressed scaled picture data into specified memory locations in accordance with the display location and size data read from the header attached to the compressed scaled picture data from each of said plurality of video transmission nodes transmitting scaled picture data, and reading the compressed picture data from the specified memory locations in a specific order to form a combined compressed picture;
   decompressing the combined picture data at one or more of the receiving nodes; and
   displaying the decompressed combined picture data.

14. A method as defined in claim 13, wherein said combined picture data defines a single full size picture.

15. A video communication system as defined in claim 1, wherein said display information means is a sequence context information inserter.

16. A video communication system as defined in claim 1, wherein said display information means is a controller.

17. A video communication system as defined in claim 1, wherein said display information means is a communication manger.

18. A video communication system as defined in claim 17, wherein said communication manager determines the size of said scaled picture data based on the number of video transmission nodes transmitting scaled picture data, and said communication manager communicates this size to said scaling means of each of said video transmission nodes that are transmitting scaled picture data.

19. A video communication system as defined in claim 17, wherein said communication manager determines and communicates a display location on said display means for each scaled picture of each of said plurality of said video transmission nodes transmitting scaled picture data, each display location being different from each other display location, such that none of the scaled pictures overlap on said display means.

20. A video communication system as defined in claim 1, and further including a second display information means for adding size and display location data to the combined picture data.

* * * * *